Jan. 20, 1970 R. W. VAN SAUN 3,491,295

R.M.S. INSTRUMENT HAVING VOLTAGE CONTROLLED OSCILLATOR IN FEED-BACK LOOP

Filed Nov. 21, 1966 2 Sheets-Sheet 1

INVENTOR.
RICHARD W. VAN SAUN

BY Christensen, Sanborn, & Matthews

ATTORNEYS

INVENTOR.
RICHARD W. VAN SAUN
BY Christensen, Sanborn, & Matthews
ATTORNEYS

United States Patent Office 3,491,295
Patented Jan. 20, 1970

3,491,295

R.M.S. INSTRUMENT HAVING VOLTAGE CONTROLLED OSCILLATOR IN FEED-BACK LOOP

Richard W. Van Saun, Edmonds, Wash., assignor to John Fluke Mfg. Co., Inc.

Filed Nov. 21, 1966, Ser. No. 595,981
Int. Cl. G01r *17/06, 19/26;* H03k *13/14*
U.S. Cl. 324—99 15 Claims

ABSTRACT OF THE DISCLOSURE

The present invention relates to an improved root-mean-square meter and more particularly to an improved meter which utilizes a variable gain amplifier and novel feedback and control circuitry for adjusting the gain thereof so that such adjustment will automatically provide an indication of the R.M.S. value of the input signal with substantially no load being imposed on the source being tested. A voltage controlled oscillator responsive to error signals generated when the output of the amplifier is compared to a known standard signal is utilized in the feedback circuit. The system thus operates to correct the error signal at a rate proportional to the error. Automatic calibration of the system is also provided.

Various types of measuring devices for determining the root-mean-square value of an applied voltage have been devised. One technique which has been utilized is that which includes the use of a variable gain amplifier disposed between the indicating circuitry and the input circuit with adjustment of the gain being made by an operator until a null condition is achieved. The feedback or gain adjustment of the amplifier is then proportional to the input signal and hence is utilized as a measure of the input voltage. It would be advantageous in such systems to have the capability of automatic gain adjustment and read-out with the rate of change of gain adjustment being proportional to the gain adjustment to be made.

It is therefore an object of the present invention to provide an automatic root-mean-square meter which includes a novel feedback circuit for adjusting the gain of a variable gain amplifier and simultaneously adjusting a digital voltage indicator.

Another object of the present invention is to provide an improved R.M.S. meter which utilizes a variable gain amplifier and feedback circuitry associated therewith for automatically adjusting the gain of the amplifier and wherein the output signals from the amplifier are adjusted by the feedback network until the output signal from the amplifier is exactly equal to a known standard and wherein thermocouple devices are utilized for determining when the output of the amplifier corresponds to that of a known standard.

An additional object of the present invention is to provide an R.M.S. meter of the type utilizing a variable gain amplifier with a feedback circuit for adjusting the gain thereof and wherein the rate of change of the amplifier gain is proportional to the adjustment to be made.

Another object of the present invention is to provide a digital R.M.S. meter utilizing a variable gain amplifier and suitable feedback network for adjusting the gain thereof to bring the output from the amplifier to a level corresponding to that of a known standard and wherein the feedback signals serve to continuously adjust a digital voltage indicating device and wherein the condition of the feedback network is periodically sampled at fixed time intervals so that the digital voltage indication is quasi-constant even though the feedback adjustment continuously undergoes small changes.

The above as well as additional advantages are achieved in accordance with the teachings of the present invention through the use of a variable gain amplifier having the unknown signal applied as an input thereto and with the output signal from the amplifier serving to energize a first thermocouple which is in series opposition with a second thermocouple having a standard known current passing therethrough. The gain of the amplifier is adjusted until a null condition is achieved between the two thermocouples, thus indicating that the output signal from the amplifier is exactly equal to the known standard current passing through the second thermocouple. When this condition is achieved the gain adjustment of the amplifier required to reach the null condition is a direct indication of the R.M.S. value of the input signal.

One of the reasons for nonuse of thermocouple devices in systems of this general type in the past is that most people have considered the same to be too slow acting to provide the desired rapid voltage indication. However, in the system of the present invention the feedback circuit for adjusting the gain of the amplifier responds not only to a difference in the output signals from the two thermocouples, but also operates to adjust the amplifier gain at a rate which is proportional to the difference in the signals from the thermocouples. Therefore when a large gain adjustment is to be accomplished the feedback circuit operates very rapidly by providing rapid control of digital resistor banks which respond to the amplified output difference signal from the thermocouples. In the specific embodiment illustrated herein a variable frequency voltage controlled oscillator is utilized for adjusting the digital resistor banks in the amplifier feedback network. Suitable counter units are connected between the feedback resistors and the variable frequency oscillator, with a digital voltage indicator being coupled with the counting network to provide an automatic digital indication of the attenuation adjustment and hence a direct indication of the R.M.S. value of the input signal.

It has been found in practice that the last digit in the multi-digit indicator tends to undergo recurring alternations since the circuitry must choose between two discrete numbers. In the system of the present invention a timing control network is coupled with the counter circuitry and digital indicator so that the indication of the voltage is sampled only at periodic intervals. A precounter and feedback circuit controlled thereby serves to reduce alternations of the lowest indicated digit.

The above and additional objects and advantages of the system will be more clearly understood from the following description when read with reference to the accompanying drawing, and wherein, FIGURE 1 is a block diagram of a preferred embodiment of the R.M.S. meter of the present invention.

Figure 1:
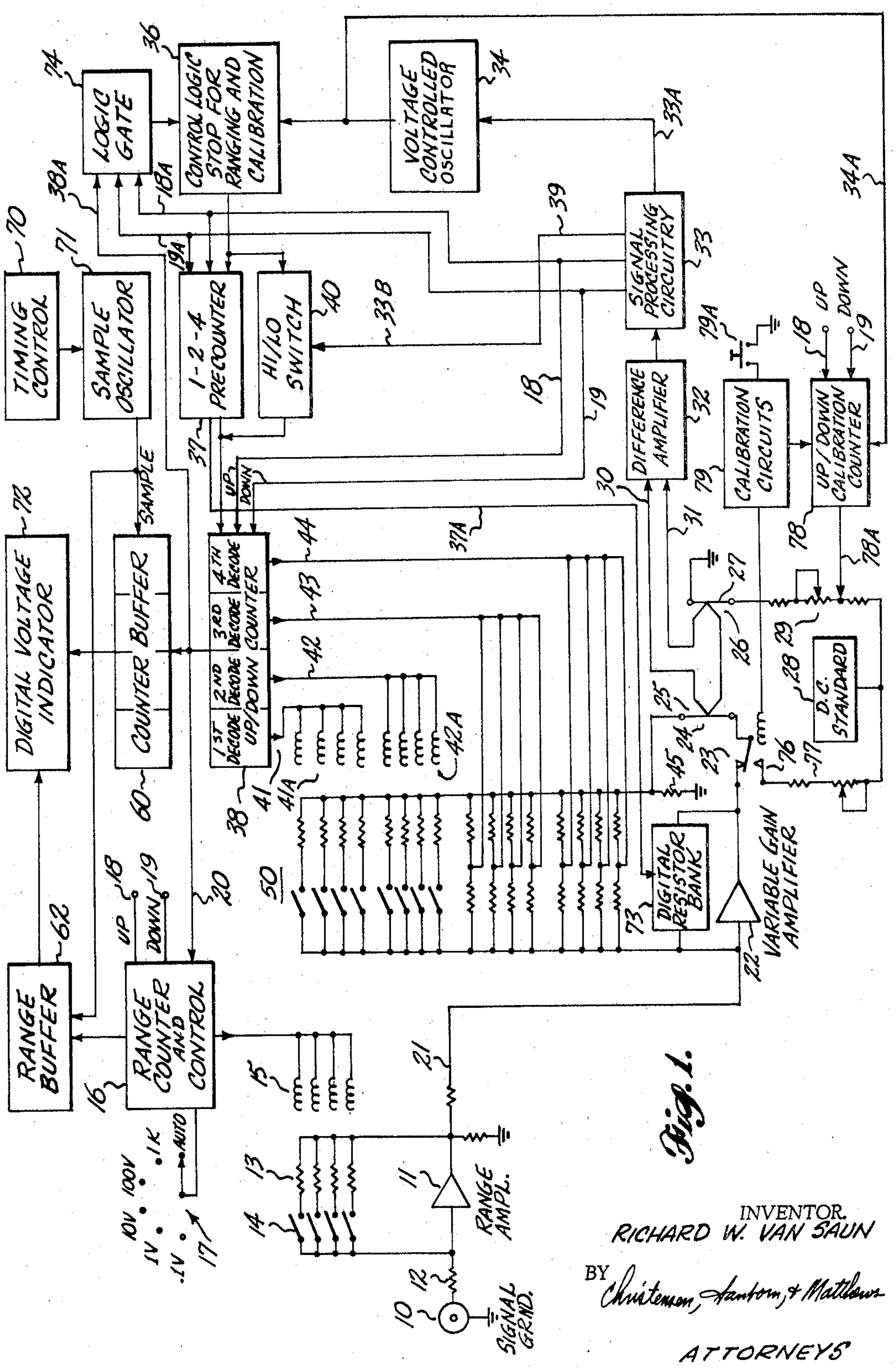

Referring now to the drawings and in particular to FIGURE 1 the system is shown as measuring the R.M.S. value of the voltage from a signal source 10 having its signal output circuit connected directly to a first variable gain range amplifier 11 through an input resistance 12. A set of range resistors 13 each having an associated switch 14 are adapted for insertion in the feedback circuit for the range amplifier 11 in accordance with the energization state of an associated relay winding 15. The degree of attenuation for the range amplifier 11 is determined by the range counter and control 16 which has a manual adjustment control 17. One position of control 17 is shown as being "auto" to signify that the adjustment of the range control is made automatically by the system in the manner described hereinafter. For this purpose the range control 16 has a pair of signal input terminals 18 and 19 respectively denoted as "up" and "down" and a counter circuit 20 connected thereto.

The output circuit from the amplifier 11 is coupled to the input of a variable gain amplifier 22. The output circuit of the variable gain amplifier 22 is connected by a first set of contacts 23 to a heater element 24 which is part of a first thermocouple 25 connected in a balanced bridge arrangement with a second standardizing thermocouple assembly 26. The assembly 26 includes a second heater element 27 which is connected directly in circuit with a known source of current shown as a D.C. standard 28. An adjustable impedance element shown as a variable resistor 29 is connected in circuit between the D.C. standard source 28 and the heater element 27.

The thermocouples 25 and 26 are connected in series opposition with the output leads 30 and 31 thereof being connected to a high sensitivity and low drift difference amplifier 32. The amplifier 32 amplifies the difference between the output signals from the thermocouples and provides an input signal to the signal processing circuitry shown generally at 33. The circuitry 33 operates on the input signals thereto and provides an output signal on lead 33A which is proportional to the absolute value of the difference between the output signals from the two thermocouples. The variable frequency voltage controlled oscillator 34 connected to lead 33A responds to such signals to provide an output signal the frequency of which is controlled by the thermocouple output signals. It should be noted that since the signals from the circuitry 33 represent the absolute value of the difference between the thermocouple output signals the frequency of the V.C.O. increases regardless of whether the signal from thermocouple 25 is too high or too low.

The output circuit of the voltage controlled oscillator is connected through a control logic network 36 and precounter 37 to a four decade "up-down" counter 38. The frequency of the V.C.O. always increases in response to an increase in the error signal of amplifier 32 and therefore the signal processing circuitry provides "count up" or "count down" control signals via leads 18 and 19 to the counter 38 (and also to the range control 16). The signal processing circuitry also provides an output signal on lead 33B to a "Hi-Lo" switch 40 connected in parallel with the precounter 37.

The decade counter 38 is shown as having four digital orders or counting sections in series. Each section is a four stage binary counter and thus the output lines 41–44 for each stage includes four separate lines for controlling selected ones of the resistors in the digital resistance bank 50 by means of the solenoids or relay windings 41A, 42A and corresponding controls included in the decade counters 43 and 44 (not illustrated). The specific details of the decade resistance bank can vary and are per se well known in the art. The important thing to be noted from FIGURE 1 is that each of the resistors in the digital resistance bank 50 is connectable from the output circuit to the input circuit of the variable gain amplifier 22 with the output circuit of the variable gain amplifier further being connected to signal ground by a resistor 45. In the system of FIGURE 1 the thermocouple 25 provides an output signal proportional to the heating effect of the current applied thereto. Therefore when the magnitude of this heating current is made exactly equal to the heating current for the standard thermocouple 26 it will be seen that the setting of the decade counter 38 represents the digital value of the voltage (R.M.S.) of the signal applied to the variable gain amplifier.

The signal processing circuitry 33 provides an output signal on lead 33A which increases in magnitude regardless of the direction in which the difference signal applied thereto changes. As the signal from the amplifier 32 increases in magnitude the frequency of the oscillator 34 increases with the frequency being proportional to the magnitude of the difference between the output signals from the first and second thermocouples. The control logic 36 responds to the output signals from the oscillator 34 to change the count of the decade counter 38 either up or down in accordance with the "up-down" signals on lines 18 and 19. The system operates in a digital mode in response to each cycle of the signal from the oscillator and thus it will be seen that the rate of increase (or decrease) of the setting of the counter 38 will be proportional to the frequency of the signals from the voltage controlled oscillator 34. The system therefore reacts very rapidly to a major difference between the output signal from the variable gain amplifier 22 and the standard signal from the thermocouple 26 to thereby cause rapid adjustment of the gain of amplifier 22. As the output signal from the amplifier 22 approaches the amplitude of the signal applied to the heater element 27 by the D.C. standard source 28, the rate of adjustment of the gain for the amplifier 22 decreases and hence overshoot and system oscillation are avoided.

As previously noted, the system includes means for automatically adjusting the range of the voltages indicated. To this end the system includes an output circuit 20 from the counter unit 38 to the range and counter control 16. The range counter and control 16 causes automatic adjustment of the resistors 13 whenever the count in the decade counter reaches a predetermined value described hereinafter. The range control 16 is coupled by buffer unit 62 to the indicator 72 for control of the decimal point in the indicators thereof. The direction in which the feedback resistance for the range amplifier 11 is to be adjusted is controlled by the up/down signals applied to the control 16 via leads 18 and 19.

The system is shown as including four digital orders in the counter. When reading voltages to this degree of accuracy with a system operating in a digital mode the last or lowest order digit thereof will tend to fluctuate between two values due primarily to internal "noise." To avoid the unpleasant condition of an operator viewing an indicator device having the numbers thereon rapidly changing, the system of the present invention includes a timing control 70 and sample oscillator 71 controlled thereby which serves to periodically operate the counter buffer gates 60 so that the output signals from the decade counter 38 will be periodically sampled and applied to the digital voltage indicator 72. The indicator 72 can conveniently be of the numerical indicating tube type. The timing control 70 can be set at any selected time interval so that the periodicity of the signal sampling will occur at such selected intervals.

The precounter 37 further serves to prevent undesired alternations of the lowest indicated digit. The precounter 37 is a three stage binary counter and will be seen to have an output circuit 37A which is connected to a second digital resistor bank 73 connected in parallel with the variable gain amplifier 22. The resistors of the bank 73 are not associated with any indicated digit and thus even though the count in the pre-counter 37 changes the settings of the resistor bank 73 the same will not affect the indicator 72. The Hi/Lo switch 40 is closed when the output signal from difference amplifier 32 is greater than a predetermined value. When this occurs signals from the oscillator are applied directly to the counter 38. Then as system balance is approached the switch 40 opens and the pre-counter counts up or down in response to small difference signals from amplifier 32 activating the oscillator. In the embodiment illustrated the precounter 37 is a 3 stage binary counter so coupled with the lowest order stage of counter 38 that an output count signal is applied to counter 38 only when the capacity of the precounter is exceeded. This means that the precounter counts up and down and adjusts the resistors 73 without affecting the indicator 72 until a count of eight is reached by the precounter. Thus the system is able to accommodate a selected amount of vacillation near the balance point. This permits the use of a voltage controlled oscillator which need not have a true zero output but can have a "zero level" such that the output thereof causes small "up" and "down" adjustments of resistors 73 to be continually made without causing undesired indicator fluctuation. Thus a feedback loop is provided which in effect defines a finite hysteresis or zero level operating range for the V.C.O. 34 and the quantizing error inherent in digital systems is avoided.

A logic control gate 74 is connected to the control logic 36 and is provided with input circuits 18A, 19A, and 38A respectively from the signal processing circuitry and from counter 38. The gate serves to lock out any signals from the V.C.O. 34 to counter 38 when the counter stops on a count of 10,999 AND "count-up" is indicated by line 18A, or when the counter stands at 0999 AND count down is indicated by line 19A. When this occurs "range up" or "range down" is required and counting is stopped until the range control 16 has adjusted the range resistors and indicator unit decimal points.

Figure 3:
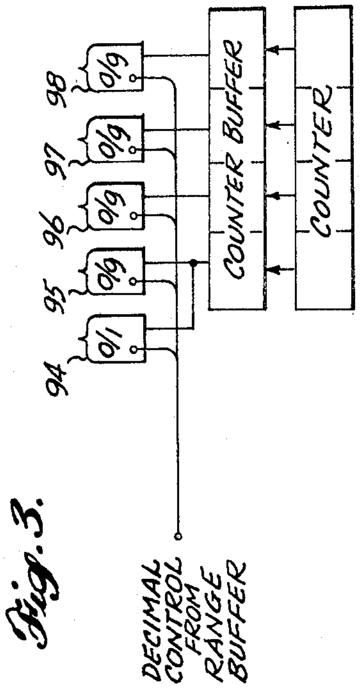
FIGURE 3 is a block diagram of the counter and indicator portions of the system of FIGURE 1.

As seen in FIGURE 3 the counter 38 has four decades while the indicator 72 has five units 94–98 shown as indicator tubes having decimal indication controlled by the range control 16. The highest order indicator 94 as well as the indicator 95 adjacent thereto on the right is coupled with the highest order counting stage. Indicator 94 normally indicates 1 or is extinguished except that when the system is in the millivolt range it indiactes zero. Thus the above statement regarding "10999 and UP" refers to the indication provided by indicator 72. For example if the system indicated 10.999 volts and an "UP" signal were received, the system would "range up" to indicate "10.99" with the indicator 74 being extinguished and the decimal moving to the right.

The system includes a calibration circuit for achieving initial zero setting and balancing of the thermocouples 25 and 26 automatically. The switch 23 coupled with the output circuit of the amplifier 22 has a second contact 76 which is used to place the heater 24 and resistors 77 in parallel circuit with the heater 27 and resistance 29. An up-down calibration counter 78 coupled with the calibration circuit control 79 is also coupled by lead 34A to the V.C.O. 34 output and by lead 78A to the resistors 29. When switch 79A is closed the up-down calibration counter acts as a variable load and responds to signals from the V.C.O. 34 to adjust the current flow through heater 27 in a direction to equalize the signals applied to difference amplifier 32. When the system has been thus calibrated the load applied by the calibration counter remains fixed.

Figure 2:
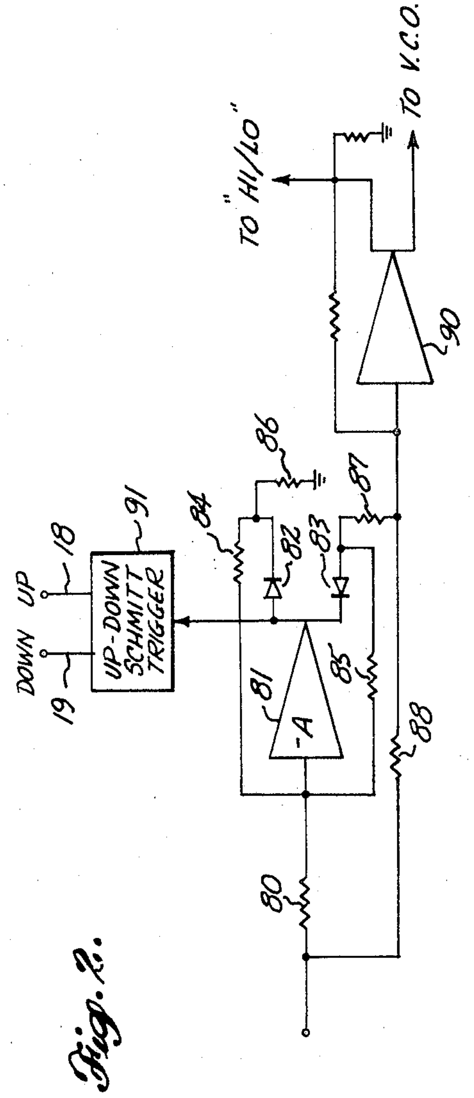
FIGURE 2 is a block diagram of the components of one arrangement of parts of the signal processing circuitry in the system of FIGURE 1.

Referring now to FIGURE 2 the details of one preferred embodiment of the components used in the signal processing circuitry 33 of FIGURE 1 will be described. The output signals from the difference amplifier 32 are applied via resistor 80 to an inverting amplifier 81 which has its output circuit coupled by the oppositely poled diodes 82 and 83 and resistors 84 and 85 to its input circuit. The diode 82 is grounded through resistor 86 while the diode 83 is further coupled with the input circuit by resistors 87 and 88 as well as to the input circuit of an output amplifier 90. The output circuit of the amplifier 90 is coupled with the voltage controlled oscillator as well as to the "Hi-Lo" switch as indicated in FIGURE 1. The output circuit of the inverting amplifier 81 is coupled with an "up-down" circuit which in the specific embodiment is shown as the Schmitt trigger circuit 91.

The arrangement is such that the inverting amplifier 81 and its associated feedback circuits acts as an absolute value amplifier and provides to the output amplifier 90 a signal proportional to the absolute value of the signals received from the difference amplifier 32. As a result the frequency of the output signal from the voltage controlled oscillator 34 increases whenever the output signals from the thermocouples 25 and 26 are not the same and regardless of which of the two signals is greater. The Schmitt trigger circuit 91 applies the necessary algebraic sign to the various parts which respond to the signals of the voltage controlled oscillator.

It should be noted that the input circuit 10 for the system is directly coupled with the range amplifier 11 and that the range amplifier 11 is in turn directly coupled with the variable gain amplifier 22. The system operation is based upon the heating effect of a current applied to the thermocouple 24 with system calibration being achieved through the use of a D.C. standard 28. Thus it will be seen that the system not only provides a digital indication of the R.M.S. value of an A.C. signal applied to the input, but also operates as an accurate direct current digital voltmeter.

There has been disclosed an improved R.M.S. meter which makes use of current heating effects and a variable frequency oscillator for controlling the feedback circuit of a variable gain amplifier. The system operates rapidly and automatically to provide a digital indication of the R.M.S. value of an input signal, and also provides the advantage of changing the resistances of the feedback circuit at a rate which is proportional to the amount of adjustment required. The system makes use of elements such as thermocouples which provide signals proportional to the heating effect of the current applied thereto and thus the system is adapted for use in measuring A.C. or D.C. voltages. While the invention has been disclosed by reference to a presently preferred embodiment thereof, it is intended that those modifications and changes which become obvious to a person skilled in the art as a result of the teachings hereof will be encompassed by the following claims.

What is claimed is:

1. An R.M.S. instrument comprising in combination: a variable gain amplifier having an input circuit and an output circuit; first circuit means coupled with said output circuit providing a first signal proportional to the R.M.S. value of a signal applied thereto; standard signal circuit means providing a second signal proportional to the R.M.S. value of a known standard; error signal circuit means including a variable frequency signal generator coupled with said first and standard circuit means and providing an output signal having a frequency related to the difference between the signals provided by said first and standard circuit means; amplifier gain control circuit means coupled with said amplifier and having its gain adjusted at a rate proportional to the frequency of said error signal circuit means; and signal indicating means coupled with said amplifier gain control circuit means.

2. An instrument as defined in claim 1 wherein said amplifier gain control circuit means includes first and second digital counters connected in series circuit between said error signal means and said amplifier, said indicating means being connected only to said second counter, and circuit means coupling the output signals from said error signal circuit means directly to said second counter when the magnitude of the difference between the output signals from said first and from said standard signal circuit means exceeds a predetermined value.

3. An instrument as defined in claim 1 wherein said first and said standard circuit means respectively include first and second thermoelectric signal generators, and wherein said error signal circuit means includes absolute value amplifier means and a voltage controlled oscillator connected in series circuit relationship.

4. An instrument as defined in claim 2 wherein: said error signal circuit means includes an absolute value difference amplifier and a voltage controlled oscillator connected in series circuit; up-down counter control means coupled with said difference amplifier and with said first and second counters; and amplitude responsive switch means connected in parallel with said first counter and controlled by said difference amplifier.

5. An instrument as defined in claim 3 and wherein said standard circuit means includes: a third digital counter, a source of reference potential coupled with said second thermoelectric signal generator, switch means for selectively connecting said source of reference potential to said first thermoelectric signal generator and disconnecting said first thermoelectric signal generator from said variable gain amplifier output circuit, and circuit means connecting said third counter to said voltage controlled oscillator and to said source of reference potential for adjusting the signal applied to said second thermoelectric signal generator.

6. An R.M.S. instrument as defined in claim 5 wherein said thermoelectric signal generators are each thermocouples.

7. An R.M.S. instrument as defined in claim 3 and including a range amplifier connected to the input circuit of said variable gain amplifier, control circuit means connecting said second counter to said range control amplifier for controlling the gain of said range amplifier; and decimal indication control means connected to said range amplifier and to said indicator means.

8. An R.M.S. instrument as defined in claim 7 and including control logic means connected between said counters and said oscillator for disabling the input circuit for said counters when said range amplifier is causing a shift in the decimal location in said indicator means.

9. An R.M.S. instrument comprising in combination: a variable gain amplifier including first gain adjustment circuit means; a first thermocouple connected in the output circuit of said amplifier; standard signal means including a second thermocouple and a signal source coupled thereto; error signal amplifier means coupled with said thermocouples; a voltage controlled oscillator coupled with said error signal amplifier means; a first digital counter coupled with said voltage controlled oscillator and with said first gain adjustment circuit means for controlling the setting thereof; a second digital counter coupled with said first digital counter and with said first gain adjustment circuit means for controlling the setting thereof; and indicator means coupled to said second counter.

10. An R.M.S. instrument as defined in claim 9 and including switch means coupled with said voltage controlled oscillator, said second counter and said error amplifier means and applying output signals from said oscillator to said second counter when the amplitude of the error signals provided by said error amplifier means achieves a predetermined value.

11. An R.M.S. instrument as defined in claim 10 wherein said error amplifier circuit means includes an absolute value amplifier coupled with said oscillator and algebraic sign signal means coupled with said counters for controlling the direction in which the settings of said counters change in response to applied signals.

12. An R.M.S. instrument as defined in claim 11 and including a range amplifier connected to the input circuit of said variable gain amplifier and coupled with said second counter and adapted to have its gain adjusted in response to control signals from said second counter; and decimal indicating means coupled with said range amplifier for control thereby.

13. An R.M.S. instrument as defined in claim 12 wherein said standard signal means includes a third digital counter and circuit means coupled therewith for adjusting the signal applied to said second thermocouple, and circuit means connecting said third counter with said error signal amplifier means.

14. An R.M.S. instrument comprising in combination: a variable gain amplifier having first and second digital resistance banks connecting the output of the amplifier to the input thereof; a first thermocouple connected in the amplifier output circuit; a second thermocouple connected in signal opposing circuit relationship with said first thermocouple; a source of direct current signals connected to said second thermocouple and providing a constant reference signal thereto; a difference amplifier connected to said thermocouples and amplifying the difference in ouput signals provided by said thermocouples; a voltage controlled oscillator; a first digital counter; circuit means connecting the output circuit of said oscillator to the input circuit of said counter; a second digital counter having an input circuit connected to the output circuit of said first counter; signal processing means connected to said difference amplifier and providing a signal to said oscillator which is proportional to the absolute value of the difference between the output signals from said thermocouples, and providing count-up or count-down control signals to said counters in accordance with the change required in the output signal from said variable gain amplifier to reduce the difference in output signals from said thermocouples; circuit means connecting said first counter with said first digital resistance bank for control of said first resistance bank by said first counter; circuit means connecting said second counter with said second digital resistance bank for control of said second resistance bank by said second counter; and digital indicating means coupled with said second counter.

15. An instrument as defined in claim 14 and including switch means connected in parallel with said first counter between said oscillator and said second counter, and means included in said signal processing circuit means coupled with said switch means for closing said switch means when the absolute value of the difference between the output signals from said thermocouples is greater than a preset value.

References Cited

UNITED STATES PATENTS 1,121,835 12/1914 Hiatt ---------- 324—106 XR
3,378,786 4/1968 Andrea ------------ 330—137

RUDOLPH V. ROLINEC, Primary Examiner
ERNEST F. KARLSEN, Assistant Examiner

U.S. Cl. X.R.

324—106, 120; 340—347